May 12, 1953
L. AVONDOGLIO
2,638,287
AIRCRAFT COWLING SEAL
Filed May 6, 1949
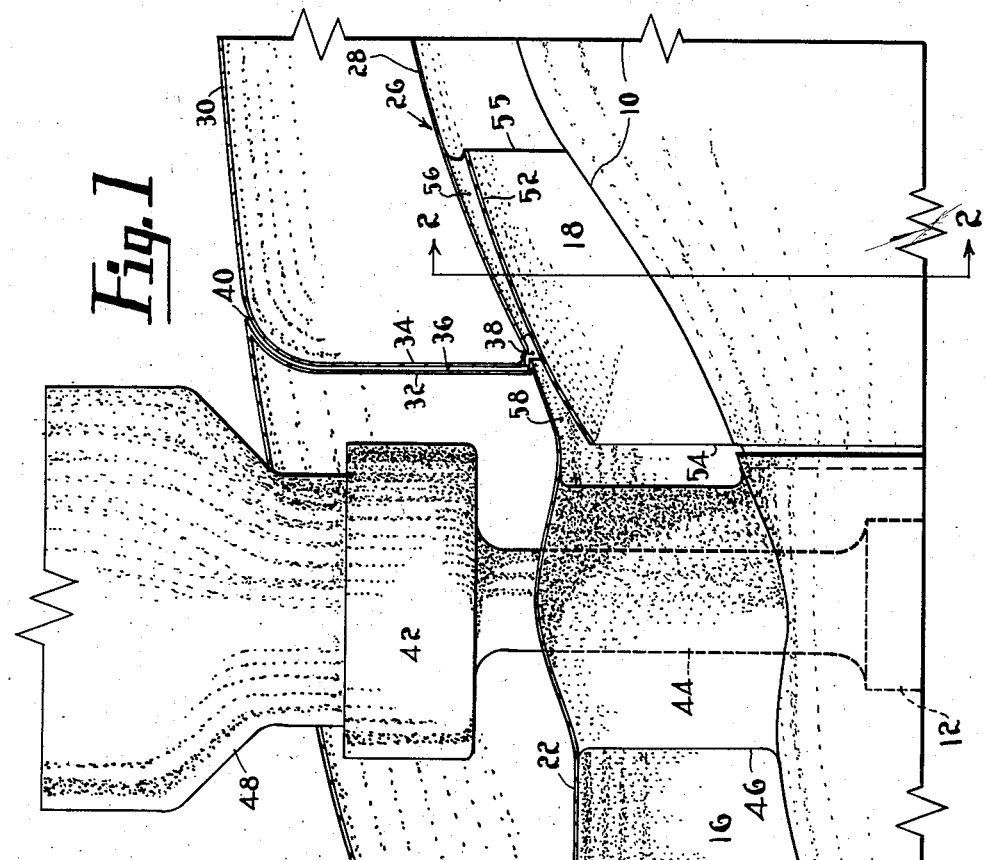
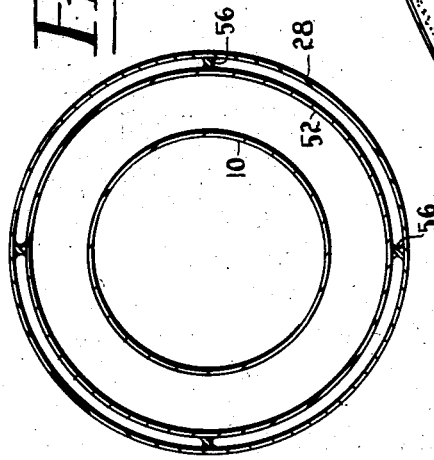
INVENTOR.
~LEO AVONDOGLIO~
BY Godfrey B. Speir
ATTORNEYS.

Patented May 12, 1953

2,638,287

UNITED STATES PATENT OFFICE 2,638,287

AIRCRAFT COWLING SEAL

Leo Avondoglio, Verona, N. J., assignor to Curtiss-Wright Corporation, a corporation of Delaware Application May 6, 1949, Serial No. 91,706

7 Claims. (Cl. 244—53)

This invention relates to rotating cowling for aircraft and particularly to a novel means for sealing the gap between rotating and fixed cowling elements where the cowling elements are provided wtih air passages therethrough.

While the invention is not limited to the particular configuration of cowling shown and described in this specification, it is particularly useful in connection with aircraft cowlings known in the art as NACA type E. Such cowlings consist of a fixed annular portion having an annular tunnel or passage for air which is led to a power plant or to other air consuming apparatus. Ahead of the fixed cowl is a rotating cowl or spinner, usually cooperating with a propeller, this rotating cowl, externally, comprising a streamlined forward prolongation of the fixed cowl, and having an axial air entrance opening leading into an annular passage which registers with the annular passage of the fixed cowling. Cowlings of this type in operation are subject to relatively low exterior air pressure while the passage or tunnel within the cowling system carries air at somewhat higher pressure due to ram effect and due to the fact that the annular air tunnel leads to apparatus across which there is a substantial pressure drop, whereby static pressure within the passage or tunnel is somewhat higher than the pressure existing outside of the cowling. Necessarily, there is a gap, to provide running clearance, between the rotating cowl and the fixed cowl and due to the pressure difference between the inside and the outside of the cowl there is usually a substantial air leakage from the air passage to the exterior of the cowl causing both a loss of air within the cowl tunnel and an increase in drag exteriorly of the cowl due to the issue of air from the gap or clearance between the cowls.

There have been suggestions in the prior art to provide a running seal for the cowling gap to prevent air leakage, such seals usually comprising a sealing ring, a leather or fabric or plastic rubbing seal or other devices. Such mechanical seals, while they may be fairly effective, increase the complication of the structure, add weight and cost, and are susceptible of rapid wear.

It is an object of the present invention to provide a dynamic seal for a cowling gap which operates without positive mechanical sealing and thus without wear, friction or complication. The purpose of the dynamic seal is to equate the static pressure in the inner end of the cowling gap at the cowl passage, to the static pressure existing at the outer end of the gap adjacent the external profile of the cowling. With equalization of pressure adjacent the gap ends within and without the cowling, there is no force tending to cause air flow therethrough and thus an effective seal is established to eliminate, minimize, or suppress any tendency for gap leakage in the cowling system.

A further object of the invention is to provide a dynamic cowling seal between rotating and stationary cowling components while another object is to apply the principle of the venturi to a cowling seal. Still another object is to provide a dynamic seal between spaced conduits in tandem relation subject to fluid flow therethrough and thereover, while another object is to provide a dynamic seal for an opening subject to fluid flow thereacross. Further objects of the invention will become apparent as the detailed description proceeds, the description being supplemented by the attached drawings in which—

Fig. 1 is a longitudinal fragmentary section through a cowling system incorporating the invention; and Fig. 2 is a section on the line 2—2 of Fig. 1.

In the drawings, only portions of the cowling assembly relevant to the invention are shown since this form of cowling is familiar to those versed in the art; it is not deemed necessary to show the cowling in conjunction with an airplane, its power plant, or other related components.

In Fig. 1, 10 represents a fixed power plant nose cowling, the power plant carrying a propeller hub 12 of any appropriate type on its output shaft. A spinner 14 embraces the propeller hub and the spinner profile is blended with that of the cowling 10 to define the inner wall of an annular air duct 16—18, 16 representing the forward portion of the duct and 18 the rearward portion thereof. The duct portion 16 is further formed by a rotating cowling or spinner 20 whose inner wall 22 defines the outer margins of the passage 16 and whose outer wall 24 defines the initial external cowling profile, of streamlined configuration. The rearward duct portion 18 is formed by a fixed cowling 26 whose inner wall 28 is the wall of the duct 18 and whose outer wall 30 forms a streamlined prolongation of the outer wall 24 of the rotating cowling 20. Preferably, the rotating cowling walls 22 and 24 are secured to one another at their rearward ends by an annular plate 32, while the forward portions of the cowl elements 28 and 30 are secured to one another by an annular plate 34. These plates 32 and 34 are in slightly spaced relation to one another and define therebetween a gap 36 enabling the rotating cowling to rotate relative to the fixed cowling without wear, abrasion, or scraping. With this gap however, there is an opportunity for air leakage from the duct 16—18 to the exterior of the cowling system, such leakage entering at the inner annular end 38 of the gap and leaving the cowling to mix with the ambient air at the outer annular end 40 of the gap.

The spinner 14 and the forward cowling 20 are secured together and are associated with propeller elements 42 mounted in the hub 12, such propeller elements including blade supports 44 extending across the passage 16 and through the outer cowling wall 22. Such blade supports 44 are embraced by streamlined fairings 46 to minimize drag in the system and obstruction to the flow of air through the passages 16—18. These fairings may be structural members securing the cowling 20 to the spinner 14 and to the propeller. As indicated previously, the form of the propeller is immaterial to this invention but normally, the propeller comprises blades 48 extending from the elements 42 and through rotating cowling wall 24 and are changeable in pitch through appropriate mechanism associated with the propeller. Alternatively, blades may be mounted in the hub 12, and may pass through the fairings 46 and the outer cowl walls 22 and 24.

During flight, static pressure in the duct 16—18, due to ram of air at the forward air entrance opening 50, is normally somewhat higher than the static pressure existing in the region of the gap end 40 on the outside of the cowling, whereby there is outward flow of air through the gap 36. In order to suppress such gap flow or leakage, which tends to diminish the ram efficiency in the duct 16—18 and which tends to increase the drag of the cowling assembly due to the issue of air from the outer gap end 40, a pressure equalizing device 52 is incorporated in the cowl system. This device 52 comprises an annular band which extends forwardly and rearwardly respectively from the gap end 38, in spaced relation to the cowling walls 22 and 26. Preferably, the band 52 may be secured to the fixed cowling wall 28 by streamlined spoke-like members 56 spaced around the cowling.

The band 52 is formed, in its relation to the profile of the inner cowling walls 22 and 28 to provide an annular venturi whose throat or narrowest portion lies at the gap end 38 and whose forward and rearward portions respectively diverge from the cowling walls 22 and 28. A portion of the ram air flowing through the ducts 16 and 18 is bypassed through the narrow annular duct 58 between the band and the cowling walls. This bypassing air is changed in its velocity and static head, in passing through the venturi, and is arranged to provide at the throat adjacent the gap 38 a reduced static pressure substantially equal to the static pressure present at the gap end 40 at the outside of the cowling. By the existence of equal pressures at the ends 38 and 40 of the gap 36, there will be no leakage or flow of air through the gap. The air passing the venturi throat, at 38, flows on through the diverging part of the duct 58 to remix with the major portion of the air which passes through the cowling ducts.

It is appreciated that the presence of the band 52 in the cowling passage will offer a minor obstruction to the flow of air through the cowling passages but by skillful design of the band, the drag provided thereby is small compared with the drag and loss of efficiency which would result if air were allowed to pass freely through the gap 36 between the rotary and stationary cowling elements, and the effect of the band on airflow through the ducts 16—18 and on ram efficiency will be small.

There might be situations wherein the flow of air through the cowling gap 36 might be inward—that is, from the ambient outside air through the gap to the ram air passage. At times this may be desirable, but if not, the shape of the annular band 52 could be modified to provide for an increase in pressure at the inner end of the gap end 38, above that pressure existing in the balance of the passage 16—18, such a result being accomplished by making the entrance and exit edges 54 and 55 of the band closely spaced to the cowling walls 22 and 28, with the spacing of the band 52 from the cowling walls in the region of the gap end 38 wider than at the forward and rearward edges of the band. Alternatively, the Venturi band might be located around the outer gap end 40.

A dynamic seal system of the type shown and described will operate with full sealing effect, when properly designed, at one condition of air speed and ambient air density, and at one condition of ram pressure and velocity within the duct 16—18. Such optimum designs should be chosen in an aircraft for the flight condition most frequently encountered. Effectiveness of the seal will be good at conditions which diverge from optimum to a considerable degree and the seal will probably be rather ineffective under conditions which diverge widely from optimum design conditions. However, the importance of seal leakage during certain operating regimes of the aircraft is not significant as to overall preformance so that the matching of optimum seal design and most frequent flight conditions will produce an overall improvement in aircraft operation. The seal arrangement can be adjustable if desirable and if justified by operating considerations. Adjustment may be made responsive to departure of gap leakage from a minimum value, such departure effecting adjustment to restore minimum leakage.

No firm design criteria for gap seals of the sort described can be given herein. However, the seal design may take into consideration the centrifugal pumping action which may occur between the cowl plates 32 and 34, boundary flow phenomena over the cowling and within the ducts, and other airflow phenomena of generic character or of a character specific to a particular cowling design and the conditions under which it is expected to operate.

It is within the scope of the invention, as limited by the appended claims, to apply the principles hereof to apparatus other than aircraft in which dynamic sealing may be useful.

Though but a single embodiment of the invention has been illustrated and described, it is to be understood that the invention may be applied in various forms. Changes may be made in the arrangements shown without departing from the spirit or scope of the invention as will be apparent to those skilled in the art, and reference should be made to the appended claims for a definition of the limits of the invention.

I claim:

1. In an aircraft cowling including a rotating spinner having an annular air duct therethrough disposed in advance of a stationary cowling having an annular internal duct forming a continuation of the spinner duct, there being a gap subject to air leakage between said spinner and cowling through which air leaks from the duct to the lower pressure area surrounding the cowling, an annulus overlying said gap within said ducts and in spaced relation to the walls of the adjacent spinner and cowling duct walls, said annulus defining, with said duct walls, an annular venturi having the gap opening into its throat; said venturi serving to equate the pressure of a small portion of the air passing through said ducts at and adjacent the inner part of said gap within said ducts to the pressure of the air coexisting at the outer part of said gap exteriorly of said cowling, thereby to suppress the passage of air through and across said gap.

2. In an aircraft cowling including a rotating spinner having an annular air duct therethrough disposed in advance of a stationary cowling having an annular internal duct forming a continuation of the spinner duct, there being a gap subject to air leakage between said spinner and cowling through which air leaks from the duct to the lower pressure area surrounding the cowling, an annulus overlying said gap within said ducts and in spaced relation to the walls of the adjacent spinner and cowling duct walls, said annulus defining, with said duct walls, an annular venturi having the gap opening into its throat; said venturi serving to equate the pressure of a small portion of the air passing through said ducts at and adjacent the inner part of said gap within said ducts to the pressure of the air coexisting at the outer part of said gap exteriorly of said cowling, thereby to suppress the passage of air through and across said gap and means securing said annulus to the stationary cowling.

3. In a cowling system for aircraft, an annular fixed cowling having a central air passage therethrough, an annular rotating cowling having a central air passage alined with that of the fixed cowling and opening thereto, said cowlings also being alined and having a gap therebetween where they lie adjacent and spaced from one another, and means to suppress air leakage through said gap between the air passages and the cowl exterior comprising an annular band secured to one of the said cowlings within said air passages, said band being spaced from the cowling inner walls and bridging over said gap, said band forming with the cowling walls, a venturi through which a portion of the air of said central passage flows, the throat of said venturi being disposed at said gap.

4. In a cowling system for aircraft, an annular fixed cowling having a central air passage therethrough, an annular rotating cowling having a central air passage alined with that of the fixed cowling and opening thereto, said cowlings also being alined and having a gap therebetween where they lie adjacent and spaced from one another, means to suppress air leakage through said gap between the air passages and the cowl exterior comprising an annular venturi-forming band within said air passages, spaced from the cowling inner walls and bridging said gap, said band outer surface diverging from the rotating and fixed cowling inner surfaces to define with the cowling surfaces an annular venturi.

5. In a cowling system for aircraft, an annular fixed cowling having a central air passage therethrough, an annular rotating cowling having a central air passage alined with that of the fixed cowling and opening thereto, said cowlings also being alined and having a gap therebetween where they lie adjacent and spaced from one another, means to suppress air leakage through said gap between the air passages and the cowl exterior comprising an annular band secured to one of said cowlings, within said air passages, said band being spaced from the cowling inner walls and bridging said gap and forming with said inner walls a venturi through which part of the air in the central passage flows, said band being so shaped as to create, at the venturi throat, at the passage end of said gap, a static air pressure substantially equal to the static air pressure at the outer end of said gap upon flow of air both over said cowling and through said passage.

6. In a duct system for aircraft comprising conduits in tandem relation having a gap therebetween and subject to airflow therethrough and thereover at different static pressures and velocities, means to minimize leakage of air through said gap comprising an annular band concentric with said conduits spaced close thereto, and bridging said gap, said band being curved in profile to define with said conduits an annular venturi whose throat lies adjacent said gap, and said band being disposed within said conduits.

7. In a duct system for aircraft comprising tandem conduits having a gap therebetween, subject to airflow and static pressure within and subject to a lesser static pressure without, means to minimize air leakage through said gap comprising an element within said conduits forming with the conduit walls a venturi having its throat disposed at said gap, whereby airflow through the venturi throat produces a pressure thereat substantially equal to the pressure without.

LEO AVONDOGLIO.

References Cited in the file of this patent

UNITED STATES PATENTS

| Number | Name | Date |
|---|---|---|
| 1,513,241 | Hardin | Oct. 28, 1924 |
| 2,075,817 | Loerke | Apr. 6, 1937 |
| 2,274,743 | Rosskopf | Mar. 3, 1942 |
| 2,396,598 | Newmann et al. | Mar. 12, 1946 |
| 2,417,945 | Parker | Mar. 25, 1947 |

FOREIGN PATENTS

| Number | Country | Date |
|---|---|---|
| 390,363 | Great Britain | Apr. 6, 1933 |